(12) United States Patent
Varadarajan

(10) Patent No.: US 8,930,273 B2
(45) Date of Patent: *Jan. 6, 2015

(54) SYSTEM AND METHOD FOR GENERATING A DYNAMIC CARD VALUE

(71) Applicant: CA, Inc., Islandia, NY (US)

(72) Inventor: Rammohan Varadarajan, Cupertino, CA (US)

(73) Assignee: CA, Inc., Islandia, NY (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/075,317

(22) Filed: Nov. 8, 2013

(65) Prior Publication Data

US 2014/0067683 A1    Mar. 6, 2014

Related U.S. Application Data

(63) Continuation of application No. 13/013,038, filed on Jan. 25, 2011, now Pat. No. 8,615,468.

(60) Provisional application No. 61/298,638, filed on Jan. 27, 2010.

(51) Int. Cl.
*G06Q 40/00*    (2012.01)

(52) U.S. Cl.
USPC .............................. 705/44; 235/379; 235/382

(58) Field of Classification Search
None
See application file for complete search history.

(56) References Cited

U.S. PATENT DOCUMENTS

| 7,469,151 | B2 * | 12/2008 | Khan et al. ...................... 455/558 |
| 7,552,467 | B2 * | 6/2009 | Lindsay ............................. 726/5 |
| 2005/0043997 | A1 * | 2/2005 | Sahota et al. ..................... 705/16 |
| 2008/0034221 | A1 * | 2/2008 | Hammad et al. .............. 713/190 |
| 2008/0110983 | A1 * | 5/2008 | Ashfield ......................... 235/382 |
| 2008/0223937 | A1 * | 9/2008 | Preta et al. ..................... 235/492 |

* cited by examiner

*Primary Examiner* — Jason M Borlinghaus
*Assistant Examiner* — Ambreen A Alladin
(74) *Attorney, Agent, or Firm* — Vierra Magen Marcus LLP

(57) ABSTRACT

A method and system is provided for generating a dynamic card value (DCV) from a mobile user device for use in a transaction between a user cardholder and a transaction provider. The DCV may be configured for use as a card verification value (CVV), also known as a card security code (CSC), a primary account number (PAN), or a portion of a PAN. The DCV may be generated using a DCV generator which may include an algorithm and a DCV generation key. The DCV generation key may be camouflaged. Obtaining a DCV from the user device may require inputting a PIN, a device identifier, a challenge or transaction information. The DCV may be used for any transaction requiring the input of a user identification number and a verification value, including, credit card transactions, debit card transactions, online or telephonic transactions.

18 Claims, 3 Drawing Sheets

SYSTEM AND METHOD FOR GENERATING A DYNAMIC CARD VALUE

TECHNICAL FIELD

The present application relates to a system and method for generating a dynamic card value on a user device, where the dynamic card value is configured for use in a transaction between a user cardholder and a transaction provider.

CROSS-REFERENCE TO RELATED APPLICATIONS

This application is a continuation of and claims the benefit of U.S. patent application Ser. No. 13/013,038 filed on Jan. 25, 2011 (now U.S. Pat. No. 8,615,468), which claims the benefit of U.S. Provisional Patent Application No. 61/298,638 filed on Jan. 27, 2010, which are hereby incorporated by reference in their entirety.

BACKGROUND

Card based transactions, such as credit and debit card transactions, have certain security vulnerabilities. In order to complete a card based transaction using, for example, a credit card, a user must provide a primary account number (PAN) and a verification value, which may be referred to as a Card Verification Value (CVV or CV2), Card Verification Code (CVC) or Card Security Code (CSC). As described herein, the terms CVV, CVC and CSC may be used interchangeably. A credit or debit card typically is provided with two card verification values. The first card verification value (CVV) is encoded into the magnetic stripe on the card. The second CVV is printed on the front or back of the card, typically in human readable characters.

The first card verification value (CVV), which is typically encoded into the magnetic stripe ("magstripe") of the card, is generally used to conduct "card present" transactions, e.g., when the user presents the card in person and the magstripe on the card is swiped or read by a card reader to obtain the card data, including the CVV, to complete a transaction. The CVV encoded on the magnetic stripe of the card is typically referred to as CVC1 or CVV1, and is a unique cryptogram which is generated based on card data and an encryption key. In a "card present" transaction, the user's card is swiped, or read, by a magnetic stripe reader, which may be a POS terminal, as an example. Information from the magstripe, including the account number, expiration date and CVV1, is sent over a network to an authenticating system, for example, the financial institution or merchant that issued the card, where the CVV is verified as a step in authorizing the transaction.

The security of the CVV encoded on the magstripe can be compromised in a number of ways. The card may be obtained from the user and the magstripe, including the encoded CVV1 can be easily read by a card reader and the data used to create a duplicate "cloned" or counterfeited card. For example, user cardholders freely hand over their cards in stores and restaurants, or use them in automated point-of-sale systems such as gas pumps. For example, an attacker may mount a very small "skimmer" to a card reader used by a legitimate merchant or retailer or to a card reader on a gas pump, unbeknownst to the merchant, retailer or gas pump operator. The small "skimmer" acts as a secondary card reader to read and record the data which may include the primary account number (PAN) or bankcard number, and the card validation code (CVV) or card security code (CSC) from the card's magstripe during a legitimate transaction. The attacker retrieves the "skimmed" card information which can then be used to create a counterfeit card. The attacker, by transferring the skimmed information to a magstripe on a counterfeit card, may clone the user's card without the need to decrypt the skimmed information.

The second card verification code, known as a CVV2 or CVC2, is typically a three-digit or four-digit value and is printed on the card or signature strip, but not encoded into the magnetic stripe. Supplying or requiring the CVV2 code in a transaction is intended to verify that the customer has the card in their possession. For example, when the transaction is a "card not present" transaction, where the card cannot be swiped to obtain the encoded CVV1, such as an on-line or telephone transaction, the CVV2 code can be inputted through a keypad or provided verbally to confirm the person conducting the transaction is in possession of the card, or at least, has knowledge of the card verification code. Alternatively, the CVV2 code may be required for a "card present" transaction in addition to the CVV1 read from the card's magstripe, as a supplemental verification that the card presented is an authentic card and not a counterfeit card produced from skimmed data.

For MasterCard™, Visa™, Diners Club™ and Discover™ credit and debit cards the second card verification code is typically a three-digit code, called the "CVC2" (card validation code), "CVV2" (card verification value), and "CVV," respectively. The CVV is not embossed like the card account number, and is typically the final group of numbers printed on the back signature panel of the card. The CVV value may also appear in a separate panel to the right of the signature strip, to prevent overwriting the CVV value when signing the card. American Express™ cards have a four-digit code printed on the front side of the card above the number, referred to as the CID (Card Identification Number or Unique Card Code). The CID is printed flat, not embossed like the card account number.

Credit and debit cards have a common numbering scheme for the card number, which is the primary account number (PAN). The PAN includes a single-digit Major Industry Identifier (MII), a six-digit Issuer Identification Number (IIN), an account number, and a single digit check sum calculated using an algorithm which is typically the Luhn algorithm. The MII is considered to be part of the IIN. The PAN is typically embossed on the front surface of the credit/debit card.

Cardholder users are subject to attacks from many venues, such as "phishing" attacks, where the cardholder is tricked into entering the PAN and/or CVV2 with other card details into a fraudulent website. The growth in phishing has reduced the real-world effectiveness of the CVV2 as an anti-fraud device. A typical credit or debit card is good for several years, during which time the embossed PAN, magstripe data and printed CVV do not change. The static nature of the magstripe data on a credit or debit card and the use of a static PAN and CVV may aggravate the problem of fraud prevention. If an attacker obtains the static card data, including the PAN and/or CVV, the attacker can readily use the card to complete transactions without detection until the legitimate cardholder reviews a billing statement, exceeds a credit limit or commits an overdraft, or the attacker's illegitimate transactions trigger a fraud detection pattern resulting in notification to the cardholder of suspect activity, account suspension or other reaction by the card issuing entity.

When used for an online or other "card not present" transaction, the PAN and/or CVV2 are provided as human readable characters, and are either keyed in, entered into a printed or faxed order form, or provided verbally. The PAN and/or CVV, when provided by any of these means, cannot typically be protected cryptographically, e.g., encoded. For printed, mailed or faxed orders, the cardholder's account information, including the PAN and/or CVV, is only as secure as the merchant's document security system. For telephone transactions, the account information, including the PAN and/or CVV, may be compromised by the customer service representative recording the information. For on-line transactions, even if a merchant web site or on-line shopping cart is fully secure, the cardholder user's computing device (PC, laptop, notebook, PDA, etc.) may not be fully secure. The user's computing device may contain malicious "Trojan" type viruses and screen wipers that record account details including the PAN and/or CVV during the online transaction, for retrieval and use in subsequent attacks on the user's account.

SUMMARY

A system for generating a dynamic card value (DCV) configured to be usable in a transaction between a user and a transaction provider is provided. The system includes a transaction interface configured to receive and transmit a card value, a user device configured to provide a dynamic card value (DCV), and a transaction server configured to verify the dynamic card value (DCV) as an authentic user card value. The transaction server and transaction interface are in operable communication with each other so as to authorize a transaction upon verification of the dynamic card value (DCV). The transaction may be configured as one of a credit card transaction, a debit card transaction and a payment card transaction. The transaction interface may be an online interface, a secure access terminal, a telephone, a fax machine, a printed order form, an online order form, an online shopping cart, an automatic teller machine (ATM) terminal, a point of sale (POS) terminal, a transponder, a receptor, a scanner, a receiver, or a combination thereof.

The DCV may be configured as one of a CVC, CVV, CSC, PAN, account number, partial PAN and a portion of an account number, as those terms are defined herein. The DCV generator may be configured to generate at least one DCV on the user device, and may further include an algorithm adapted to generate at least one DCV. The system may include a DCV generation key, and may further include a provisioning server adapted to configure the DCV generator for the user device.

A method for generating a DCV configured to be usable in a transaction between a user and a transaction provider is provided. The method includes generating the DCV from a user device, wherein the DCV is configured for input into a transaction interface. The user device may be configured as a telephone. The method further includes inputting the DCV into the transaction interface, verifying the DCV using a transaction system, and using the verified DCV as the user DCV for the transaction. The DCV may be configured as one of a CVC, CVV, CSC, PAN, account number, partial PAN and a portion of an account number. Further, the DCV may be configured as one of a character string of one or more alphanumeric or special characters, a datum or an electronic signal transmittable from the user device, a datum or an electronic signal generated by the user device; and a human-readable output.

The method may include inputting a PIN into the user device to generate the DCV. A device identifier may be generated which uniquely identifies the user device. The device identifier may be input into the user device as the PIN. The PIN may be configured for input into the user device as one of or a combination of a character string of one or more alphanumeric or special characters, a datum or an electronic signal transmittable from the user device, a datum or an electronic signal generated by the user device, and a biometric parameter including one of a voice print, retinal print and fingerprint.

Obtaining the DCV from the user device may include providing a DCV generator to the user device, and generating the DCV using the DCV generator, wherein the DCV generator may include a DCV generating algorithm. A DCV generation key may be used to generate a DCV from the user device. The DCV generation key may be camouflaged using at least one of encryption, obfuscation and cryptographic camouflage. The DCV generation key may be configured as a symmetric key, a Data Encryption Standard (DES) key, an Advanced Encryption Standard (AES) key, a non-symmetric key, a secret, a secret byte array, a Card Verification Key (CVK), Unique DEA Key A (UDKA), a Unique DEA Key B (UDKB), a seed or an indexed key list. Generating the DCV from the user device may further include inputting a challenge into the user device.

DETAILED DESCRIPTION

Figure 1:
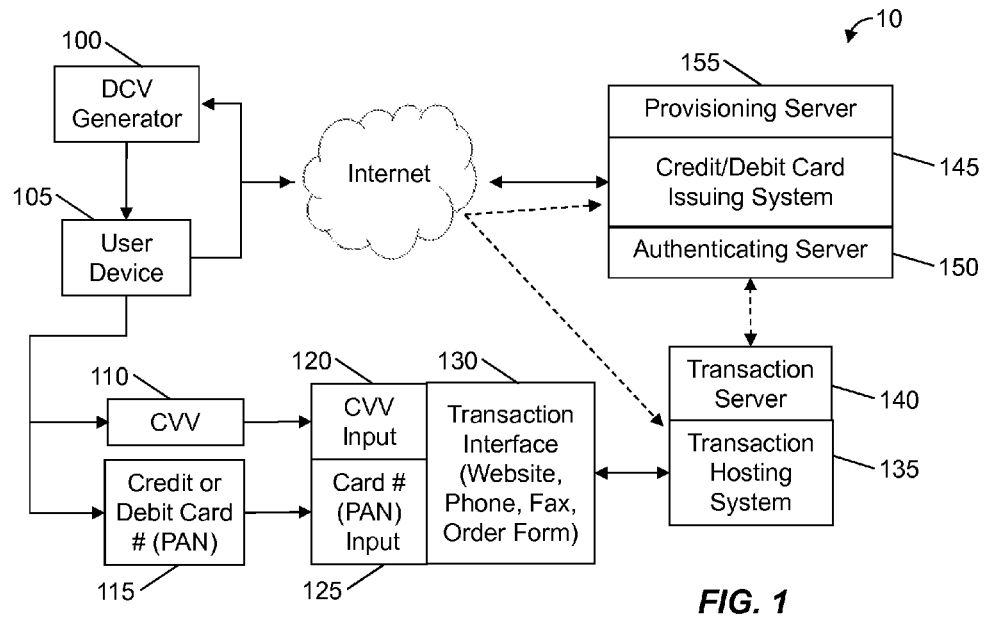
FIG. 1 is a schematic illustration of an exemplary system for generating and using a dynamic card value (DCV)

Provided herein is a system and method to generate a dynamic card value (DCV) or combination of DCVs for use in a credit/debit card transaction as a substitute, replacement or equivalent value for a static card value printed, embossed and/or recorded on the credit/debit card. The generated DCV is a dynamic card value, e.g., it is valid or usable for a limited number of transactions or limited period of time. The DCV may be generated, for example, as a one-time PAN or one time DCV, limited to use with a single transaction. Alternatively, the DCV, as described herein, may be provided for use for a fixed number of transactions or may be activated for a predetermined period of time.

The DCV is configured and provided in the same form as the static DCV for which it is being substituted. For example, if the static CVV is a three digit number, then the dynamic CVV is generated as a three digit number. If the static PAN is a sixteen digit number, then the dynamic PAN is generated as a sixteen digit number. Alternatively, the DCV may represent a portion of the static number. For example, a DCV associated with a PAN may represent a portion of the PAN, such as the account number and single digit check sum, which are typically the remaining ten digits of the PAN following the six-digit Issuer Identification Number (IIN). In this case, the DCV would be configured as a ten digit number, and the cardholder would require possession or knowledge of the PAN, or at least the six digit IIN of the PAN, for use in conjunction with the ten digit DCV account number (partial PAN). By providing a DCV configured in the same form as the static value it is representing, the generated DCV can be used in any context where the static DCV would have been used; e.g., directly inputted into a keypad; inputted for an online purchase; spoken or keyed in during a telephone-based transaction; inputted into an order form which may be printed, scanned or completed online and transmitted manually, by email, facsimile or mail to the transaction provider.

In a non-limiting example, a DCV is provided for a card based transaction, e.g., a credit card transaction. The generated DCV may be a dynamic PAN or a dynamic CVV. The system and method may provide more than one type of DCV, for example, both a dynamic PAN and a dynamic CVV may be generated for use in the same transaction. The system and method provided herein to generate and provide a DCV can be used in any context where any representation of an account code, a user identification number, a verification value or a security code is required for access, approval or authentication, e.g., for online authentication of a credit or debit card or approval of a card not present (CNP) transaction, authorization of an online sale of securities, release of medical records, other payment or non-payment transaction or other secure access scenario where a verification value may be used to authenticate a requestor as the legitimate cardholder or account owner. For example, the card may be a medical insurance card with a magnetic stripe and the DCV may be a verification value required for on-line or over-the-phone CNP release of medical information, authorization of a prescription or authentication of the patient subscriber to the insurance provider. For another example, the card may be an account card which requires DCV authorization for some or all transactions, e.g., to authorize on-line or over-the-phone CNP stock trades, funds transfer or access to confidential information.

In a non-limiting example, the card may be configured as a credit card which may be used, for example, for CNP transactions including on-line, email, mail, facsimile, telephone or other CNP transaction interfaces, and further including transactions in a "brick and mortar" institution, such as a retailer, merchant, restaurant, ATM or point-of-sale (POS) terminal where the PAN and/or CVV is required to verify or authenticate the cardholder. The system and method may provide for a means to expire or invalidate the generated DCV after a limited number of uses, which may be a single use, or after a limited period of time, for example, 24 hours after the generated DCV has been provided to the user. After expiration of a DCV, the user may obtain a newly generated DCV from the user device for use in subsequent transaction(s) or for the next time period until its expiration. This effectively prevents or limits many attacks on credit/debit card transactions, by limiting the number of transactions and/or time an attacker may use a dynamic PAN or dynamic CVV. For example, an attacker may obtain a user cardholder's PAN and/or CVV through a "phishing" scam or "Trojan" virus, by intercepting the information from a printed order form, overhearing a telephone transaction or through other means. However, if the system has been configured with DCVs, e.g., to require a dynamic PAN and/or dynamic CVV, the number of transactions and/or length of time the particular PAN and/or CVV (which the attacker obtained) is effective will be limited by the account settings. For example, if the PAN and/or CVV obtained by the attacker during a transaction were configured for one-time use, the PAN and/or CVV would have been expired after the transaction and the attack would be foiled. Even if the attacker were to prevent the first (legitimate) transaction and use the one time DCV himself, he is limited to, at most, one fraudulent transaction. If the dynamic PAN and/or CVV were configured for expiration after a limited number of uses or after a limited time period, by this method, the attack would be significantly prevented or severely limited.

To implement the system described herein, two components are required. First, the user must have a mechanism for generating DCVs. Secondly, the provider system, e.g., the entity issuing the credit or debit card, which may be a bank or other financial institution, must have a mechanism for verifying the generated DCV provided by the user during a transaction. The system and method provided herein includes both of these capabilities, providing an end-to-end solution that is convenient and easy for users and simple to implement for the card-issuing entity or provider system.

Provided herein is a system and method for DCV generation using a DCV generator on a handheld mobile user device, such as a mobile phone, a "smart" phone, PDA or notebook. The DCV generator may use an industry-standard algorithm for DCV generation, or may use a customized algorithm or other suitable algorithm. The algorithm may be recorded on tangible, non-transitory memory. The algorithm may be encrypted or obfuscated using any suitable means, for example, by cryptographic camouflaging.

The user downloads the DCV application to his mobile user device, which can be virtually any hand-held platform. This includes so-called "smart" phones such as the BlackBerry™ and iPhone™, as well as simpler phones from many manufacturers. The DCV generator may be used with any computing device, including a laptop, desktop, netbook or other computer. To use the DCV generator, the user runs the DCV application on his mobile user device, and, if required, enters a PIN or passcode which may be the static CVV from the user's card or another PIN. The PIN may, alternatively, be generated by the user device without user input. The application may use internally-stored keys to generate the DCV, and the application may provide the generated DCV to the user or to a transaction interface to complete a transaction.

The generated DCV is inputted to a transaction interface and the transaction interface provides the DCV to the issuing entity's authentication system by the user. Since the issuing entity knows this user is conducting transactions using generated DCVs, rather than the user's static PAN and/or CVV, the issuing entity system knows to validate the inputted PAN and/or CVV as a generated PAN and/or CVV rather than as the static PAN and/or CVV recorded on the user's credit/debit card.

The methods and system for generating DCVs provided herein are configured for implementation on almost all handheld devices, including all popular modern phones. The user interface is simple and easy to use, and can be branded with provider-specific logos, for example, the logo of the entity (bank, retailer, etc.) issuing the credit or debit card. The keys used to generate the DCVs may be protected using cryptographic camouflage, which may also incorporate machine identification techniques such as the use of a machine effective speed calibration parameter, or MESC. This provides strong protection of the DCV-generation keys, such that even if an attacker steals the user's mobile phone, he cannot crack the keys and generate his own DCVs. The resulting solution is strong, portable, and easy to use, thus providing benefits for both the card issuing entity, e.g., the bank or merchant, and the end user.

Additional advantages can be realized with the ability to securely host the software client (DCV generating application) on a variety of mobile phones and user handheld devices (iPhone™, Blackberry™, etc.), including increased user convenience, for example, by not requiring a user to contact the bank to obtain a replacement credit or debit card when the user believes his PAN and/or CVV may have been compromised. The ability to generate a DCV (PAN or CVV), without a PIN input to the user device may provide an additional user convenience. Another layer of security can be provided where the DCV generator is further protected using a device derived identification parameter or device generated PIN which is unique to the user device or machine used to host the DCV generating application. As would be understood, the system and method described herein could also be provided and securely hosted, for example, in JavaScript™ within a browser used by a desktop computer, laptop, netbook, or other Internet accessible computing device, to generate DCVs for online transactions.

A system and method for generating a DCV, which may be a dynamic PAN, a dynamic partial PAN or a dynamic CVV, for use in a credit or debit card transaction between a user and a transaction provider is provided herein. The transaction provider or provisioning system may be a card issuing entity such as a bank or other financial institution, a retailer, merchant or other payment services provider. The transaction venue may include "brick and mortar," telephone or fax based, or online venues. The transaction interface may be, for example, an online interface or a secure access terminal, a telephone, an online or printed order form which may be faxed, mailed or e-mailed, an automatic teller machine (ATM), or a point of sale (POS) terminal.

The system and method include obtaining a DCV from a user device, where the DCV is configured for input as a user DCV into the transaction interface. For example, a dynamic CVV may typically be configured as a 3-digit or 4-digit number and a dynamic PAN may typically be configured as a 16-digit number. A dynamic partial PAN may be configured, for example, as a 10-digit number representing the account code and check digit. The DCV may be configured in any form or manner required for input as a DCV by the transaction interface, for example, as one of or a combination of a character string of one or more alpha-numeric or special characters, a datum or an electronic signal transmittable from the user device, a datum or an electronic signal generated by the user device, or as a user instruction. These examples are not intended to be limiting in scope, and it is understood that the DCV may be configured as any form of DCV which may be generated by a user device and inputted into a transaction interface.

The DCV may be input into a transaction interface by a means or method acceptable to the transaction provider. The DCV may be displayed to the user in human readable form, to be subsequently keyed in, written or provided verbally to the transaction interface. The DCV input interface may be a keypad on a user device or computing device or a pinpad on a terminal whereby the user may use the pad to input the DCV, or the DCV may be inputted to a receiver for an electronic signal or datum by transmitting the DCV directly from the user device. The transaction interface could also include a scanning device where the DCV may be an instruction to the user to provide a biometric parameter, for example, a retinal print or fingerprint, or to speak a word provided as the DCV as a voice print, to the scanner interface. Further, the DCV may be provided as a signal or datum using any of a number of contactless communication technologies, including but not limited to Bluetooth, RFID, transponders, proximity card communication techniques, and other methods known to those skilled in the art of near field communication technologies.

The transaction provider system may be configured to communicate with the transaction authenticating system, which may be the card issuing system, to verify and/or authenticate the generated DCV as an authorized DCV for the transaction. The verifying system may include the capability to independently generate user DCVs, so as to provide the capability to match the inputted DCV to a corresponding DCV or list of verified DCVs for that user, and by doing so, verify the generated DCV as an authorized or authenticated user DCV.

The method for obtaining a DCV from a user device may include providing a DCV application to the user device which may include a DCV generator to generate the DCVs (e.g., to generate PANs and/or CVVs) using an algorithm and a DCV key. The DCV generating algorithm may be a standardized DCV generating algorithm, such as HOTP, EMV/CAP, or other OATH-approved standard, or may be another or customized DCV generating algorithm.

The DCV key, which may also be referred to as a DCV generation key, may be a symmetric key, a Data Encryption Standard (DES) key, an Advanced Encryption Standard (AES) key, a non-symmetric key, a secret, a secret byte array, a Card Verification Key (CVK), Unique DEA Key A (UDKA), a Unique DEA Key B (UDKB) key, a seed or an indexed key list. The DCV key may be camouflaged prior to being provided to the user device, using any of a number of encryption, obfuscation and cryptographic camouflaging techniques. For example, the DCV generation key may be cryptographically camouflaged using a PIN, which may be the user's fixed or static account CVV, a device identification parameter generated from the user's device, or some other data element. A combination of two or more of a PIN, a DCV, a device identifier and another data element may also be used in the camouflaging process.

The user may obtain a DCV from the user device by opening or selecting the DCV application on the user device, and if required, selecting a "generate PAN," "generate CVV" or a similar command from the device menu. The DCV may be generated and provided without any further user input, e.g., the user may not be required to input a PIN. Alternatively, a PIN input into the user device may be required to obtain a DCV. The PIN may be input passively, for example, it may be provided by the DCV generating application when the user selects the application or prompts the device to generate a DCV, again, without requiring further input from the user. As another example, the PIN may be input passively in the form of a device identifier which is unique to the user's device. In this instance, the DCV generating application, when selected by the user, may collect information from the user's device to generate a unique device identification parameter which can be provided as the PIN to the DCV generator. This provides additional security that the request for a DCV is being initiated from an authorized user device and that the DCV application has not been ported or copied over to another (unauthorized) device.

The PIN may be in any configuration which can be input into the user device. For example, the PIN may be a character string of one or more alpha-numeric or special characters inputted into the keypad, a picture or graphic selected from the device screen, or a challenge transmitted to the user's device as an SMS or text message, a datum or an electronic signal transmitted from the user device, a biometric parameter such as the user's voice print spoken into the device, a retinal scan provided to the device's camera, or a fingerprint provided to a print pad on the device. Further, the PIN may be provided using any of a number of contactless communication technologies, including but not limited to Bluetooth, RFID, transponders, proximity card communication techniques, and other methods known to those skilled in the art of near field communication technologies. These examples are not intended to be limiting in scope, and it would be understood that any form of PIN which may be input into the user device would be suitable.

Referring to the drawings, wherein like reference numbers correspond to like or similar components throughout the several figures, there is shown in FIG. 1 a schematic illustration of an exemplary system 10. The system 10 includes a user device 105, which may be any of a variety of user mobile phones, personal digital assistances (PDAs) and handheld devices (iPhone™, Blackberry™, etc.) or other computing device, such as a computer, laptop or netbook. A DCV generating application, also referred to as a DCV generator 100, may be stored on the user device 105, for example, by downloading the DCV generator 100 from a provisioning server 155. The DCV generator 100 may be identified on the user device by a logo associating it with the card provider system, which could be the entity 145 issuing the user's credit/debit card 115. The DCV generator 100 can be selected as an application on the user device 105, through a menu screen, by selecting from a menu list, by selecting an icon or a hot key associated with the application, or by other suitable means. The DCV generator 100 provides a DCV 110 to the user device 105 when a user request for a DCV 110 is initiated. The DCV generator may be configured to provide a dynamic PAN, a dynamic CVV, or both a dynamic PAN and CVV to the user.

The DCV generator 100 may be configured to provide a generated DCV (PAN 115 and/or CVV 110) configured in the same configuration as a static user PAN and/or CVV for the particular provider interface 130. Referring again to the example shown in FIG. 1, it is noted that a typical static PAN and CVV for a credit or debit card is a numeric string, which is typically embossed, printed or stamped on the credit or debit card. In this instance, the DCV generator 100 would provide each generated DCV as a numeric string in the same configuration as the static user DCV, as a human-readable output. Because the generated DCV (PAN 115 and/or CVV 110) is configured the same as the card's static DCV, the user can readily input the generated DCV into the DCV input interfaces 120, 125 to be transmitted to the transaction server 140. The authenticating server 150, which is in communication with the transaction server 140 through an internet or non-internet enabled connection, will recognize the dynamic PAN 115 and/or CVV 110 as generated by a DCV generator, either by association with an account enabled or activated to required a generated DCV, or other similar means, and will validate it accordingly.

The transaction interface 130 may include a CVV input interface 120 and a PAN input interface 125. The CVV input interface 120 may be configured as a keypad or pinpad whereby the user may use the keypad to input CVV 110, for example, when the transaction interface 130 is a website, telephone, PDA, POS terminal or ATM keypad. The CVV input interface 120 may also be configured as a receiver for an electronic signal or datum transmitted directly from the user device 105.

The PAN input interface 125, used for inputting the user's credit/debit card account number 115 may be configured as a keypad of a computing or user device, a pinpad of a POS or ATM terminal, a magnetic stripe reader, a chip reader, a website, a telephone for voice or keypad input, a fax machine, printed order form or other media into which entry of a credit/debit account number (PAN) is required to initiate a transaction. The example of a credit/debit card is not intended to be limiting in scope. For example, the card may be any form of "transaction card," for example, a Speedpass™ or similar chip-RFID transponder or contactless payment method, from which a card number may be input into an interface 125. Further, the user device 105 may provide information to the transaction interface 130 using any of a number of contactless communication technologies, including but not limited to Bluetooth, RFID, transponders, proximity card communication techniques, and other methods known to those skilled in the art of near field communication technologies. Alternatively, the transaction interface 130 may be configured to accept "card not present" transactions, as would an online transaction interface, where input to the card reader 125 may be manual input of an account number 115 or portion thereof, submitted in conjunction with CVV 110 to verify the transaction.

As shown in FIG. 1, transaction interface 130 may be in operable communication with a transaction host system 135, which may be the hosting system for an online payment system. The host system 135 includes a transaction server 140 for the processing of credit/debit card transactions originating from a transaction interface 130, which may be an online shopping cart 130 associated with an online retailer. The processing functions of the server 140 may include confirmation of the transaction details of a given transaction, e.g., the transaction amount, availability of funds, etc. and may also include transmitting credit/debit card information including a PAN and a CVV to the authenticating server 150 for verification and authentication of the transaction, prior to authorizing and executing the transaction. The transaction server 140 may be part of the hosting system 135, may be part of the provider system 145 or may be hosted by a third party.

Referring to FIG. 1, the provider (card-issuing) system 145 includes an authenticating server 150, to verify a DCV (PAN 115 and/or CVV 110) inputted to a transaction interface 130 as an authentic DCV corresponding to the user's credit/debit card account. The authenticating server 150 uses information specific to the user's DCV generator 100 provided by the provisioning server 155 to independently generate DCVs for that user's credit/debit card account, for the purpose of verifying the inputted DCVs as authenticated DCV inputs for that user's credit/debit card. The functions of the authenticating server 150 and provisioning server 155 may be provided by a single server, or may be distributed among multiple servers, including third party servers.

The provider system 145, which in the example shown is the system of the card issuing entity 145, may also include a web interface (not shown) through which a user may enroll to receive an activation code to obtain, download and install a DCV generator 100. The provisioning server 155 receives a request through the provider or card issuing system 145 for DCV enrollment according to the preferred method 20 shown in FIG. 2, and downloads and activates a DCV generator 100 on a user device 105 according to the activation process 30 shown in FIG. 3. The provisioning server 155, as part of the DCV generator activation process 30, generates a DCV generation key, also referred to as a DCV key, which the server 155 may optionally camouflage. The DCV key is used to create the DCV generator 100 which is specific to the user credit/debit card account corresponding to card 115. The DCV generator 100 is downloaded to the user device 105.

Referring again to FIG. 1, depicted is a method whereby a user (not shown) contacts the provider system 145 to enroll or activate their user account, here represented as the credit/debit card account associated with the credit/debit card account number (PAN) 115. The activation or enrollment process may include user selection of configuration options for the DCV. For example, the user may selectively activate an option to require DCVs (dynamic PANs and/or CVVs) for card not present transactions. The user may receive an activation code through mail, email, as a SMS or text message, in a voice mail or by other means, which may be used to access and download the DCV application, including a DCV generator 100, from the provisioning server 155 to the user device 105. The user, to complete a transaction, for example, to complete a purchase from an online retailer website 130 using a credit card 115, may select the DCV application on their user device 105, using a method generally illustrated in FIG. 4. The DCV generator 100 may provide a dynamic PAN 115 and/or dynamic CVV 110 and display the dynamic PAN 115 and/or dynamic CVV 110 on the user device 105. The user may enter the generated credit card account number (PAN) 115 into the credit card input field 125 of an online retailer shopping cart 130 and/or enters the generated CVV 110 into the CVV input field 120 of the online shopping cart 130. The user may then enter other details of the transaction as required, for example, the preferred shipping method, shipping address, etc. The transaction interface 130 may convey the transaction information, including PAN 115, CVV 110 and the transaction payment amount, to the hosting system 135, which may convey the transaction information to transaction server 140, which may be part of the hosting system 135 or the user's card issuing system 145. The information may be received by the transaction server 140 for processing, where processing may include contacting the card issuing system 145 to verify the user credit card account number 115 inputted by the user, the user's credit limit or funds availability, and authenticity of the user provided PAN and/or CVV, which in this case, may be a generated DCV. The authenticating server 150 may receive the inputted PAN 115 and CVV 110 for verification. The authenticating server 150 may be configured to independently, and/or with an equivalent method, generate one or more DCVs associated with the particular user account 115. The authenticating server may independently generate one or more DCVs, which may include one or more verifiable dynamic PANs and one or more verifiable dynamic CVVs, and if the user inputted DCVs are matched to verifiable DCVs, the inputted DCVs are authenticated to the transaction server 140. If all other (non-DCV) criteria are met, the transaction server 140 authorizes and executes the transaction to the transaction interface 130, in this example, to the online shopping cart 130. The authenticating server 150 records the use of the DCV (PAN and/or CVV) and determines the DCV expiration according to the account settings. For example, if the DCV is a one-time use DCV, the DCV would, upon completion of the transaction, become expired and would be removed from the database of verifiable DCVs so as not to be accepted or verified related to subsequent transactions. If the DCV was, for example, configured by the account settings to be usable for 12 hours after first use, the authenticating server 150 would set the expiration time for 12 hours after the first transaction at which time the DCV would be invalidated.

Figure 2:
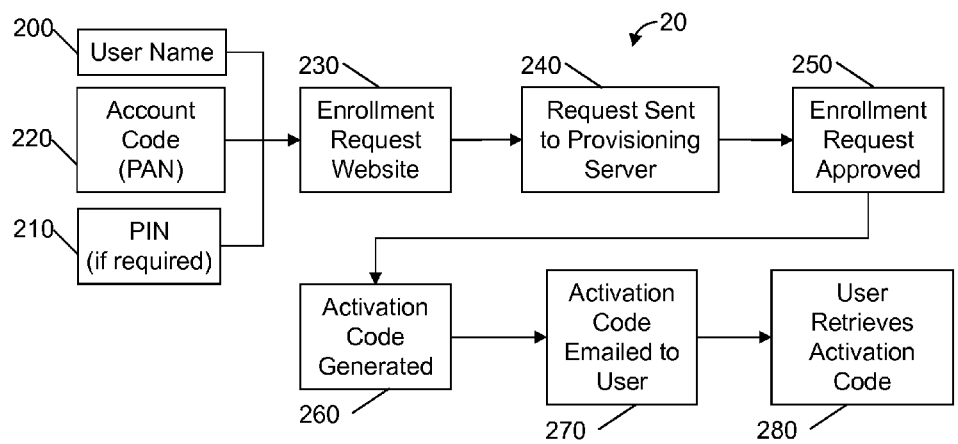
FIG. 2 is a schematic illustration of a process to provide an activation code.

Referring now to FIG. 2, shown is a schematic illustration of a process to provide an activation code to download a DCV generator 100 to a user device 105. The activation code is provided through a representative provisioning implementation or enrollment sequence 20. A user cardholder contacts the provisioning server 240, which may be the provisioning server 155 of FIG. 1, via a web session and through a DCV enrollment website 230, which may be hosted by the card provider system 145 of FIG. 1. The cardholder may create or provide a username 200, a PIN 210 (if required) and an account code 220. The DCV enrollment website 230 forwards the cardholder inputted information with a request for DCV enrollment to the provisioning server at 240. The server at 240 approves the request and generates at step 260 and revives at step 270 a strong "Activation Code" to the user cardholder, for use in activating the DCV application on the user device. Alternatively, the DCV activation code may be sent to the user cardholder by e-mail, mail, a short message system (SMS) text message, voice message or other individualized means. The user retrieves Activation Code at 280 for use in an activation sequence, for example, the activation sequence shown in FIG. 3.

During the enrollment session, the user may also be prompted to elect rules regarding the use of the generated DCV(s) and the static DCV(s) associated with the user's account. For example, the user may elect to disable the static PAN and/or CVV for online and other card not present (CNP) transactions, and allow the use of the static DCV(s) at card present transactions only. As another example, the user may elect to limit the use of the static DCV(s) to three sequential transactions, to limit exposure in the event the static DCV(s) is stolen or compromised, but to retain a limited number of transactions that can be authorized by the static DCV(s), in the event the user's DCV generating device becomes lost or disabled or otherwise unavailable to provide a generated DCV(s) for the user's legitimate transactions. Further, the user may elect the usage and expiration settings for each DCV. The cardholder may specify the generated PAN and/or CVV are one-time DCVs, expiring after a single use. Alternatively, the cardholder may specify that each (maximum) generated PAN and/or CVV may be used for a limited number of transactions, and/or for or within a limited (maximum) amount of time after being generated, after which the DCVs are expired and invalidated, requiring the cardholder to generate a new DCV (PAN and/or CVV) from their user device 105 for a subsequent use or transaction.

Figure 3:
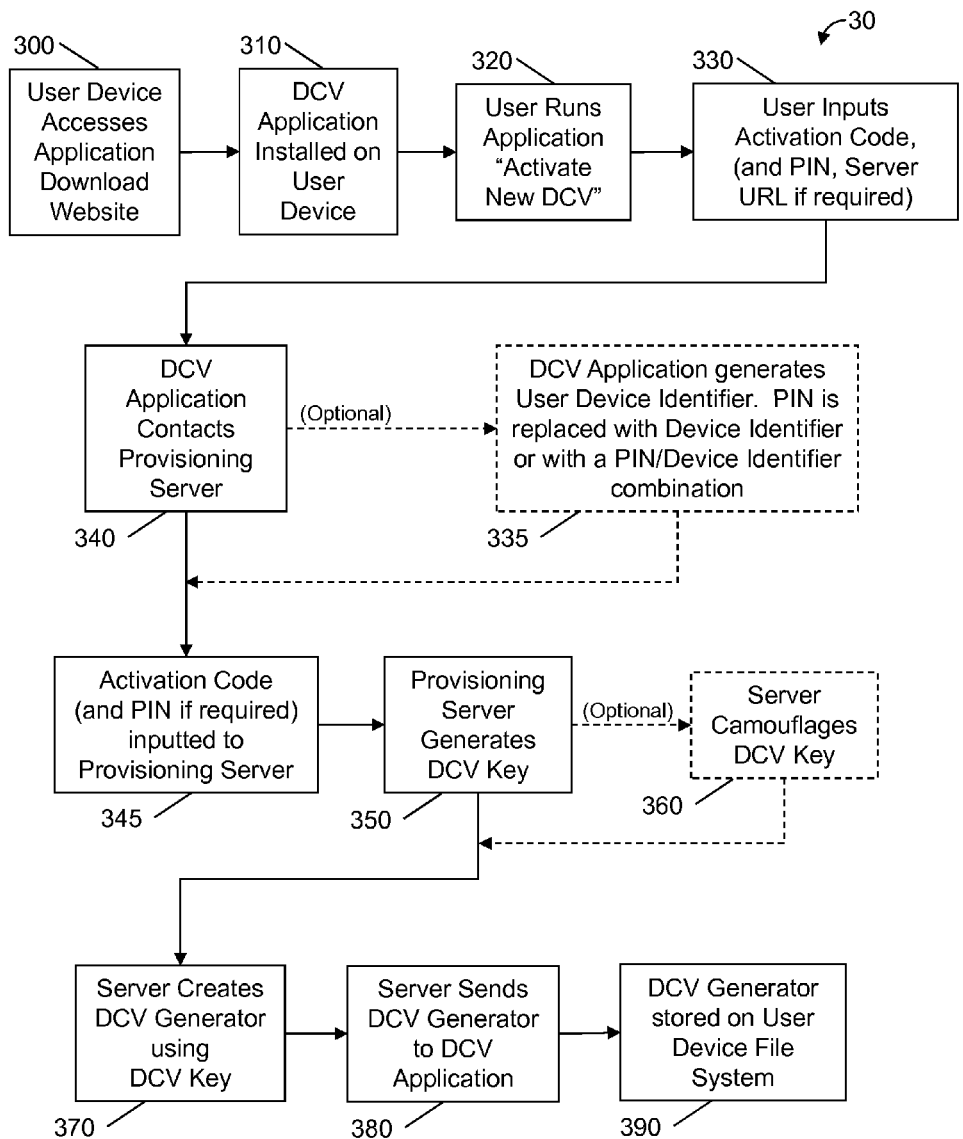
FIG. 3 is a schematic illustration of a process to provide a DCV generator to a user device.

Referring now to FIG. 3, provided is a representative activation sequence 30, which provides a DCV generator 100 capable of generating DCVs to a user device 105. Beginning with step 300, the user cardholder accesses the DCV application download website through the cardholder's user device, which may typically be a mobile device, for example, a mobile phone, a PDA such as an iPhone™ or Blackberry™ or may be a laptop, notebook or other internet accessible device. The DCV Application is installed at step 310 on the user's device 105. The user runs the installed DCV Application at step 320 by selecting "Activate New DCV," "Activate New Card Value" or "Activate New PAN/CVV" or similar, from the DCV Application menu. The user, at step 330, inputs the DCV activation code retrieved in step 280, and if required, a PIN 210. The user may also need to input the URL of the provisioning server 155 at step 330, if the URL is required and not provided by default.

Optionally, a user device identification parameter, or device identifier, may be generated at step 335 of FIG. 3, to enable an additional level of security by associating the DCV application on the user device with that particular user device, through a unique device identifier, such as a machine effective speed calibration (MESC) generated from unique data collected from the user device. In the event the DCV application is configured to incorporate a user device identifier in the DCV generating process, at step 335 the DCV application may execute an application, which may be a fingerprint code (FPC) or similar lightweight and portable client with no footprint, such as JavaScript, Flash or pure Java, to collect information from the user device and generate a unique device identifier for the user device. The device identifier may be used as a PIN or in combination with a PIN, to further secure the DCV application to the user's device, or to detect porting of the DCV application to an unauthorized device, for example. The DCV application may also be configured such that when the user subsequently requests a DCV from the user device, the DCV generator generates the device identifier and automatically provides the device identifier as a PIN without input from the user, increasing the convenience of obtaining a DCV by eliminating user input of a PIN during a DCV request session.

Referring again to FIG. 3, at step 340 the DCV Application contacts the Provisioning Server and at step 345 provides a PIN, or optionally, provides a device identifier or PIN/device identifier combination as a PIN. The provisioning server, at step 350, generates a DCV generation key. A DCV key to be used to generate dynamic CVVs may be, for example, generated by applying a card verification key (CVK) to the user's account number and related account information, such as the card expiration date and service code, to generate a DCV key which is specific to the user's account. The DCV key may be a symmetric key, a DES key, an AES key, a CVK, a UDKA, a UDKB, a non-symmetric key, a secret, a secret byte array, a seed or a key associated with an indexed key list. Optionally, the server, at 360, may camouflage the DCV key by using any suitable method to camouflage, encrypt or obfuscate the DCV key.

Continuing with FIG. 3, step 370, the server creates a DCV generator using the DCV generation key. If required, for configurations where a DCV counter is utilized to synchronize the DCV generator on the user device with the authentication server, the provisioning server sets the user device and authentication server DCV counter to zero. The DCV generator may include a DCV generating algorithm. The DCV generating algorithm may be any type of algorithm, for example, an ARQC generating algorithm in compliance with EMV standard protocol, an OATH-approved algorithm or another algorithm. The DCV generating algorithm may be recorded on tangible, non-transitory memory, such as the memory of the user device, and configured to generate at least one DCV. The provisioning server at 380 sends the DCV generator to the DCV application on the user's device. At 390, the DCV application stores the DCV generator in the user device file system, completing the activation sequence.

Figure 4:
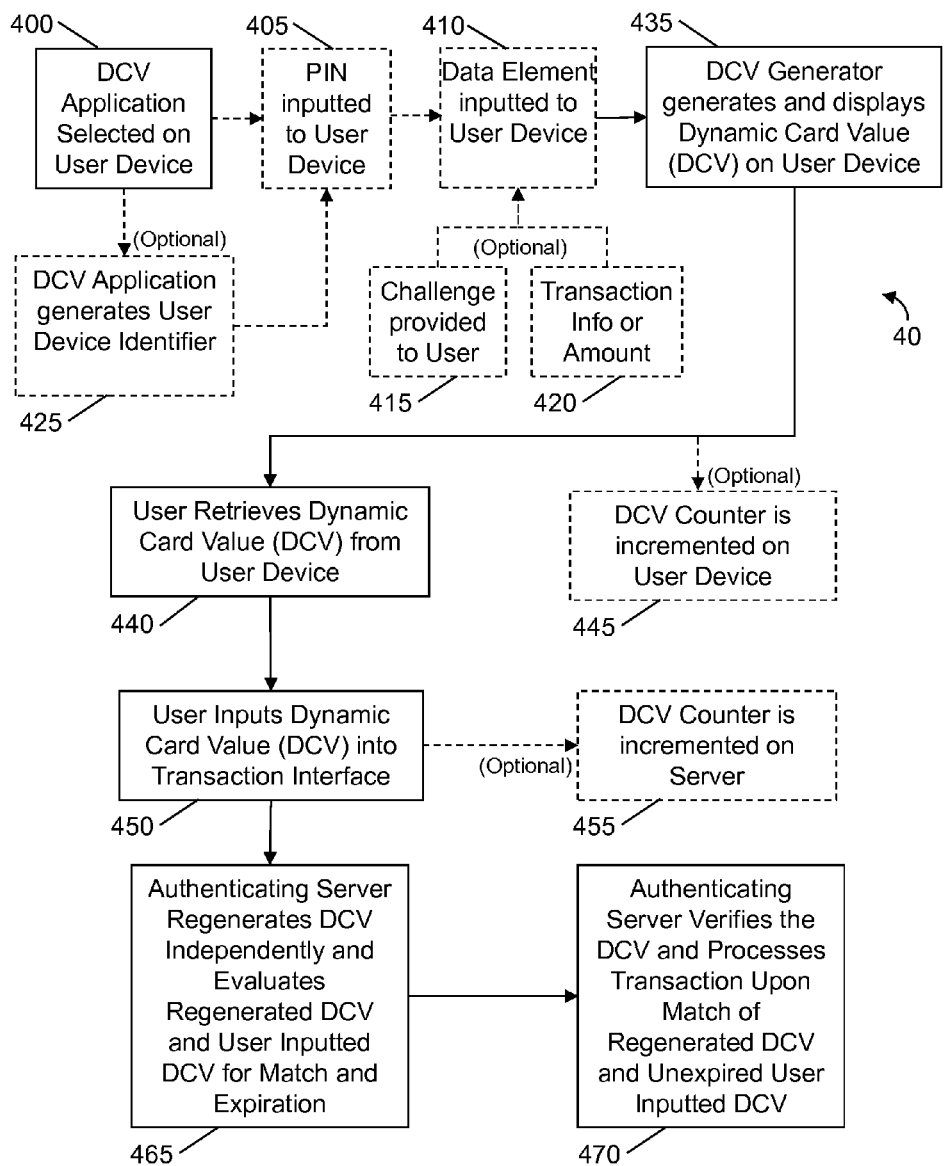
FIG. 4 is a schematic illustration of a process to obtain, from a user device, a DCV for a transaction.

Referring now to FIG. 4, shown is a schematic illustration of a usage process 40 to obtain, from a user device; a DCV for a transaction. Additional features and advantages are possible using the DCV application on a user device. For example, the DCV application can store DCV generators for multiple credit cards, debit cards, other DCV authorized payment or transaction cards, and for cards from different issuers or providers, on a single user device. For configurations including a DCV counter, the DCV counter can be reset through the DCV application on the user's device, by the user manually, or through application-server communication enabled by the user device, eliminating the inconvenience of contacting the provider in the event of DCV counter nonsynchrony. The DCV application can be updated automatically and without the need to replace user device hardware or the user card.

It would be understood that the DCV application can be downloaded and activated on multiple user devices for the same credit/debit account. As an example, for a joint account, the DCV application could be activated on both of the joint cardholder's user devices, which also could be of different types, for example, an iPhone™ and a Blackberry™, with transparency to each user. Each user can be provided a DCV generator corresponding to the joint account, or specifically to the card issued to each of the joint cardholders, where each card may have the same or different static DCV (PAN and/or CVV). By including a device identifier in the DCV generator, where the included device identifier is unique to each user device accessing a joint account, each transaction and DCV is further identifiable to the user device conducting a transaction or requesting a DCV. In the event of multiple incorrect DCV inputs during a DCV request sequence, resetting the DCV generator can be expedited through a support telephone call and reset of the DCV application on the user device, which can, if necessary, include providing a new DCV key and providing a new DCV generator.

A method 40 for using a DCV generating application with a user device is illustrated in FIG. 4. Referring to FIG. 4, the user, at step 400, selects the DCV generating application on the user device. At step 405, the user is optionally required to provide a PIN. In a first (optional) configuration the PIN may be input through the user device keypad by the user. In a second (optional) configuration, the DCV application may at step 425 generate a user device identifier, which may be the same device identifier generated at step 335 (see FIG. 3), and provide the device identifier as the PIN at step 405, without requiring input by the user. This configuration may further increase user security, for example, by detecting whether the application has been ported to another (unauthorized) device by an attacker. The other (unauthorized) device will generate an invalid device identifier which may prompt the DCV generator to display a DCV which would be recognizable as an alert code by the authenticating server. Upon recognizing the alert DCV, the authenticating server may decline the transaction, notify the user and/or card-issuing entity and/or store the DCV for detection of a second intrusion attempt by the non-user device attempting to execute the DCV generating application. In a third (optional) configuration, step 405 is not required and the DCV application proceeds to step 435 or optionally, to step 410.

At optional step 410, the user may be required to provide a data element which may be used by the DCV generator to generate a DCV. The data element provided at step 410 may be, for example, a challenge 415 provided by the server to the user through an SMS text message, voice mail, email or similar means, where the challenge may be a string of alphanumeric characters or another form recognizable to the authentication server. The data element may be transaction related information 420, for example, the user may be prompted to input the total purchase or payment amount of the transaction. The use of a data element 410 to generate the DCV at 435 may be helpful, for example, to thwart "man-in-the-middle" of similar attacks, by providing an additional data element to authenticate the user, user device, transaction interface or transaction to the provisioning server. Alternatively, the user may be provided an alarm or alert code which may be inputted as the data element to notify the server to provide a non-valid DCV or to terminate all authorization, for example, in the event of a personal security threat or stolen user device.

At step 435, the DCV generator generates and provides, typically in a human readable format, a DCV (PAN and/or CVV) on the user device. Optionally, the DCV application, after generating the DCV, increments the DCV counter on the user device at step 445, if required to maintain synchrony with the authenticating server according to the system configuration. The user, at step 440, retrieves the DCV from the user device and inputs the DCV into the transaction interface at step 450. Optionally, the authenticating server, upon receipt of the DCV, increments the DCV counter on the server at step 455, if required to maintain synchrony with the user device DCV generator according to the system configuration. The server, at step 465, regenerates a DCV independently and compares it with the user provided DCV for validity, including expiration status. Upon successful match and determination that the user inputted DCV is not an expired DCV, at step 470 the server authenticates the DCV and authorizes the transaction with respect to the DCV. Alternatively, the server, at step 465, may generate or provide a series or group of DCVs independently and may compare the inputted DCV with the DCVs in the series or group. A match of the inputted (user generated) DCV with a DCV in the series or group may be determined to be a successful match.

While the method shown in FIG. 4 is for a transaction using a credit or debit card with a PAN authorized by a CVV, where either the PAN or CVV or both the PAN and CVV may be provided as a DCV, it is understood that a generally similar system could be used for other transactional processes or authorizing and authenticating systems which require verification by inputting a user identifier or an account code and/or a secondary code, such as a PIN or additional data element.

While the above processes are described in detail with respect to transactional systems, including payment systems, the broader applicability of the claimed invention to securely generate and provide, through a user device, a dynamic value generated from a datum, where the datum may be camouflaged and/or may be of various types, including but not limited to symmetric keys, non-symmetric keys, secrets, seeds and indexed key lists, for a broad scope of applications including secure access systems, identity authentication systems, non-financial authorization systems, and medical related systems would be understood and recognized. Those having ordinary skill in the art will further recognize that terms such as "encrypt," "obfuscate," "key," "PIN," "PAN," "CVV," "CSC," "server," "website," "code," "challenge," etc., are used descriptively of the figures, and do not represent limitations on the scope of the invention where other terms may be used in a generally equivalently descriptive manner.

While the best modes and other embodiments for carrying out the claimed invention have been described in detail, those familiar with the art to which this invention relates will recognize various alternative designs and embodiments for practicing the invention within the scope of this application and the appended claims.

The invention claimed is:

1. A system for generating a dynamic card value (DCV) configured for use in a transaction between a user and a transaction provider, the system comprising:
   a first user device including a DCV application;
   wherein:
      the first user device is configured to selectively communicate with a provisioning server;
      the provisioning server is adapted to configure the DCV application for the first user device;
      configuring the DCV application for the first user device includes:
         generating a first device identifier using the DCV application;
         wherein the first device identifier is defined by and unique to the first user device;
         providing the first device identifier to the provisioning server via the first user device;
      the DCV application includes a first DCV generator configured to generate a first provider DCV using the first device identifier;
      the provider DCV is configured for use with a first transaction provider;
      the first DCV generator is configured using the first device identifier; and
      the DCV application receives the first DCV generator from the provisioning server via the first user device.

2. The system of claim 1, wherein the first provider DCV is configured as one of a Card Verification Code (CVC), Card Verification Value (CVV, CVV2 or CV2), Card Security Code (CSC), primary account number (PAN), account number, partial PAN and a portion of an account number.

3. The system of claim 1, wherein the DCV application includes a second DCV generator configured to generate a second provider DCV;
   wherein the second provider DCV is configured for use with a second transaction provider; and
   wherein the DCV application receives the second DCV generator from the provisioning server via the first user device.

4. The system of claim 1, wherein the DCV application is configured to:
   automatically generate the first device identifier each time the first provider DCV is generated; and
   automatically input the automatically generated first device identifier to the first provider DCV generator to generate the first provider DCV.

5. The system of claim 1, wherein the DCV application includes a DCV generation key configured by the provisioning server to generate the DCV.

6. The system of claim 1, wherein the DCV application configured for the first user device is further configured to:
   automatically generate a hosting device identifier defined by and unique to a hosting user device;
   wherein the hosting user device is a user device upon which the DCV application configured for the first user device is being executed;
   identify the hosting user device as one of the first user device and a non-authorized device using the hosting device identifier; and
   automatically generate an alert DCV when the user device is identified by the DCV application as the non-authorized device.

7. A method for generating a dynamic card value (DCV) configured for use in a transaction between a user and a transaction provider, the method comprising:
   configuring a DCV application on a first user device, wherein configuring the DCV application on the first user device includes:
      generating a first device identifier using the DCV application;
      wherein the first device identifier is defined by and unique to the first user device; and
      providing the first device identifier to a provisioning server via the first user device;
      wherein the provisioning server is adapted to configure the DCV application for the first user device using the first device identifier;
      receiving a first DCV generator from the provisioning server via the first user device;
      wherein the first DCV generator is configured to generate a first provider DCV using the first device identifier; and
      wherein the first provider DCV is configured for use with a first transaction provider.

8. The method of claim 7, wherein the first provider DCV is configured as one of a Card Verification Code (CVC), Card Verification Value (CVV, CVV2 or CV2), Card Security Code (CSC), primary account number (PAN), account number, partial PAN and a portion of an account number.

9. The method of claim 7, further comprising:
   receiving a second DCV generator to the DCV application from the provisioning server via the first user device;
   wherein the second DCV generator is configured to generate a second DCV; and
   wherein the second provider DCV is configured for use with a second transaction provider.

10. The method of claim 7, further comprising:
automatically generating the first device identifier each time the first provider DCV is generated; and
automatically inputting the automatically generated first device identifier to the first provider DCV generator to generate the first provider DCV.

11. The method of claim 7, wherein the DCV application includes a DCV generation key configured by the provisioning server to generate the DCV.

12. The method of claim 7, further comprising:
automatically generating a hosting device identifier defined by and unique to a hosting user device using the DCV application;
wherein the hosting user device is a user device upon which the DCV application configured for the first user device is being executed;
identifying the hosting user device as one of the first user device and a non-authorized device using the hosting device identifier; and
automatically generating an alert DCV when the user device is identified by the DCV application as the non-authorized device.

13. A tangible, non-transitory computer-readable medium having instructions stored thereon that when executed by a processor perform a method for generating a dynamic card value (DCV) configured for use in a transaction between a user and a transaction provider, the method comprising:
configuring a DCV application on a first user device, wherein configuring the DCV application on the first user device includes:
generating a first device identifier using the DCV application;
wherein the first device identifier is defined by and unique to the first user device; and
providing the first device identifier to a provisioning server via the first user device;
wherein the provisioning server is adapted to configure the DCV application for the first user device using the first device identifier;
receiving a first DCV generator from the provisioning server via the first user device;
wherein the first DCV generator is configured to generate a first provider DCV using the first device identifier; and
wherein the first provider DCV is configured for use with a first transaction provider.

14. The tangible, non-transitory computer-readable medium of claim 13, wherein the first provider DCV is configured as one of a Card Verification Code (CVC), Card Verification Value (CVV, CVV2 or CV2), Card Security Code (CSC), primary account number (PAN), account number, partial PAN and a portion of an account number.

15. The tangible, non-transitory computer-readable medium of claim 13, the method further comprising:
receiving a second DCV generator to the DCV application from the provisioning server via the first user device;
wherein the second DCV generator is configured to generate a second DCV; and
wherein the second provider DCV is configured for use with a second transaction provider.

16. The tangible, non-transitory computer-readable medium of claim 13, the method further comprising:
automatically generating the first device identifier each time the first provider DCV is generated; and
automatically inputting the automatically generated first device identifier to the first provider DCV generator to generate the first provider DCV.

17. The tangible, non-transitory computer-readable medium of claim 13, wherein the DCV application includes a DCV generation key configured by the provisioning server to generate the DCV.

18. The tangible, non-transitory computer-readable medium of claim 13, the method further comprising:
automatically generating a hosting device identifier defined by and unique to a hosting user device using the DCV application;
wherein the hosting user device is a user device upon which the DCV application configured for the first user device is being executed;
identifying the hosting user device as one of the first user device and a non-authorized device using the hosting device identifier; and
automatically generating an alert DCV when the user device is identified by the DCV application as the non-authorized device.

* * * * *